United States Patent [19]
Iwata et al.

[11] Patent Number: 5,912,193
[45] Date of Patent: Jun. 15, 1999

[54] THERMOPLASTIC POLYURETHANES AND MOLDED ARTICLES COMPRISING THEM

[75] Inventors: Shizuo Iwata, Saijou; Shinya Katoh, Kurashiki; Kimio Nakayama, Kurashiki; Tetsuya Ashida, Kurashiki; Hisao Yoneda, Kurashiki; Michihiro Ishiguro, Kurashiki; Koji Hirai, Kurashiki, all of Japan

[73] Assignee: Kuraray Co., Ltd., Kurashiki, Japan

[21] Appl. No.: 09/033,653

[22] Filed: Mar. 3, 1998

Related U.S. Application Data

[62] Division of application No. 08/652,131, May 23, 1996, Pat. No. 5,780,573.

[30] Foreign Application Priority Data

Jun. 13, 1995 [JP] Japan .................................. 6-146042
Jul. 11, 1995 [JP] Japan .................................. 6-174593
Aug. 7, 1995 [JP] Japan .................................. 6-219423

[51] Int. Cl.$^6$ .................................................. B32B 27/04
[52] U.S. Cl. ........................ 442/102; 264/176.1; 428/152; 428/423.1; 428/904; 442/62; 442/400
[58] Field of Search ............................ 442/400, 62, 102; 264/176.1; 428/423.1, 904, 152

[56] References Cited

FOREIGN PATENT DOCUMENTS

| | | |
|---|---|---|
| 0 194 452 | 9/1986 | European Pat. Off. . |
| 0 572 682 | 12/1993 | European Pat. Off. . |
| 0 651 017 | 5/1995 | European Pat. Off. . |
| 2 080 637 | 11/1971 | France . |
| 19 61 996 | 7/1970 | Germany . |

OTHER PUBLICATIONS

Journal of Applied Polymer Science, vol. 51, No. 6, Feb. 7, 1994, pp. 1077–1085, Chang et al, "Role of Functionality in MDI–Based Elastomer Preparation".

*Primary Examiner*—James J. Bell
*Attorney, Agent, or Firm*—Oblon, Spivak, McClelland, Maier & Neustadt, P.C.

[57] ABSTRACT

Disclosed are thermoplastic polyurethanes obtainable by reacting (a) a polyester-polyol that satisfies all the following requirements (1) to (4):

(1) its ester group content (number of ester bonds/number of all carbon atoms) is from 0.08 to 0.17;

(2) it has hydroxyl groups of from 2.01 to 2.08 per one molecule;

(3) it has a number average molecular weight of from 1000 to 7000; and (4) it has a crystallization enthalpy ($\Delta H$) of 70 J/g or less, (b) an organic diisocyanate and (c) a chain extender at a ratio that satisfies the following numerical formula (i):

$$1.00 \leq b/(a+c) \leq 1.10 \qquad (i)$$

where a indicates the number of mols of the polyester-polyol, b indicates the number of mols of the organic diisocyanate, and c indicates the number of mols of the chain extender, and methods for producing them; molded articles comprising such thermoplastic polyurethanes; resilient fibers comprising such thermoplastic polyurethanes and methods for producing the fibers; and laminates composed of melt-molded layers of such thermoplastic polyurethanes and fibrous base layers. The thermoplastic polyurethanes of the invention have excellent heat resistance, friction melt resistance, cold resistance, hydrolysis resistance and compression set and have excellent melt-moldability. The resilient polyurethane fibers of the invention have excellent heat resistance, wet heat resistance, hot water resistance, restorability of resiliency and homogeneousness. The laminates of the invention have a soft hand and have excellent friction melt resistance, abrasion resistance, bleeding resistance and whitening resistance.

3 Claims, No Drawings

THERMOPLASTIC POLYURETHANES AND MOLDED ARTICLES COMPRISING THEM

This application is a Divisional of Ser. No. 08/652,131 May 23, 1996 now U.S. Pat. No. 5,780,573.

BACKGROUND OF THE INVENTION

1. Field of the Invention

The present invention relates to thermoplastic polyurethanes having various excellent characteristics of high heat resistance, friction melt resistance, cold resistance and hydrolysis resistance with high compression set and having excellent melt-moldability, to molded articles comprising such thermoplastic polyurethanes, to resilient polyurethane fibers, to laminates composed of melt-molded layers of thermoplastic polyurethanes and fibrous base layers and to methods for producing such thermoplastic polyurethanes and resilient polyurethane fibers.

2. Background of the Invention

As having various excellent characteristics of high resilience, abrasion resistance and oil resistance, polyurethanes are specifically noted as substituents for rubber and plastics and have heretofore been widely used in various fields as molding materials to which ordinary methods of molding and machining plastics are applicable.

Known polyurethanes include polyether polyurethanes to be produced from polyether-polyols, polyester polyurethanes to be produced from polyester-polyols, and polycarbonate polyurethanes to be produced from polycarbonate-polyols. These polyurethanes are widely used as raw materials for fibers, sheets, films, adhesives, coating materials, etc. In general, polyether polyurethanes have excellent hydrolysis resistance but are poor in light fastness, aging resistance under heat and chlorine resistance. Polyester polyurethanes have excellent mechanical characteristics and abrasion resistance but are poor in hydrolysis resistance and mildew resistance. Polycarbonate polyurethanes have excellent durability in addition to the characteristics of polyester polyurethanes but are poor in cold resistance and are high-priced.

Conventional polyester polyurethanes which have been improved in the hydrolysis resistance and the flexibility at low temperatures are known. For example, Japanese Patent Laid-Open No. 61-185520 refers to polyester polyurethanes to be produced from polyester-polyols which have a molecular weight of from 500 to 30000 and which are obtained by reacting a mixture comprising 1,9-nonanediol and polyols of the following general formula (A) with dicarboxylic acids.

$$HO-(CH_2)n-CR^1R^2-(CH_2)n-OH \quad (A)$$

wherein $R^1$ represents a methyl group or an ethyl group; $R^2$ represents a hydrogen atom, a methyl group, an ethyl group, a hydroxymethyl group or a hydroxyethyl group; and n represents an integer of from 1 to 5.

However, only polyurethanes as produced from polyester-diols having two hydroxyl groups in one molecule are concretely illustrated in the above-mentioned Japanese Patent Laid-Open No. 61-185520. It is hard to say that the characteristics of friction melt resistances heat resistance and compression set of these polyurethanes and molded articles comprising them are on the satisfactory level for practical use, although their hydrolysis resistance and flexibility at low temperatures have been somewhat improved over those of conventional polyester polyurethanes. In addition, if the polyurethanes are formed into resilient polyurethane fibers, their melt-spinning stability is poor so that the resilient polyurethane fibers formed are poorly homogeneous.

Methods for producing resilient polyurethane fibers are referred to in Japanese Patent Laid-Open No. 2-127515 and 4-11011, in which prepolymers comprising polyfunctional polyols and isocyanates are added to and mixed with molten polyurethanes and the resulting mixtures are then spun. According to the methods referred to in these laid-open patent applications, it is difficult to uniformly mix polyurethanes with prepolymers added thereto with the result that the compositions of the resulting polyurethane mixtures are uneven and therefore the fibers to be obtained by spinning the mixtures are poorly homogeneous. The polyester-polyols that are concretely disclosed in these laid-open patent applications as raw materials for polyurethanes all have a crystallization enthalpy ($\Delta H$) of more than 70 J/g, and these give resilient polyurethane fibers with poor cold resistance.

SUMMARY OF THE INVENTION

One object of the present invention is to provide thermoplastic polyurethanes having various excellent characteristics of high heat resistance, friction melt resistance, cold resistance and hydrolysis resistance with high compression set and having excellent melt-moldability, methods for producing such thermoplastic polyurethanes, as well as molded articles comprising such thermoplastic polyurethanes.

Another object of the present invention is to provide resilient polyurethane fibers having excellent characteristics of high heat resistance, wet heat resistance, hot water resistance, resilient restorability and homogeneousness and also methods for smoothly producing resilient polyurethane fibers having such excellent characteristics.

Still another object of the present invention is to provide laminates composed of melt-molded layers of thermoplastic polyurethanes and fibrous base layers, which have a soft hand and have excellent friction melt resistance, abrasion resistance, bleeding resistance and whitening resistance.

According to the present invention, these objects are attained by providing thermoplastic polyurethanes obtainable by reacting (a) a polyester-polyol that satisfies all the following requirements (1) to (4):

(1) its ester group content (number of ester bonds/number of all carbon atoms) is from 0.08 to 0.17;

(2) it has hydroxyl groups of from 2.01 to 2.08 per one molecule;

(3) it has a number average molecular weight of from 1000 to 7000; and (4) it has a crystallization enthalpy ($\Delta H$) of 70 J/g or less, (b) an organic diisocyanate and (c) a chain extender at a ratio that satisfies the following numerical formula (i):

$$1.00 \leq b/(a+c) \leq 1.10 \quad (i)$$

where a indicates the number of mols of the polyester-polyol, b indicates the number of mols of the organic disocyanate, and c indicates the number of mols of the chain extender, and also by providing molded articles comprising such thermoplastic polyurethanes.

The other object is attained by providing resilient polyurethane fibers comprising thermoplastic polyurethanes obtainable by reacting (a) a polyester-polyol that satisfies all the following requirements (1) to (4):

(1) its ester group content (number of ester bonds/number of all carbon atoms) is from 0.08 to 0.17;

(2) it has hydroxyl groups of from 2.01 to 2.08 per one molecule;

(3') it has a number average molecular weight of from 1000 to 5000; and (4) it has a crystallization enthalpy (ΔH) of 70 J/g or less, (b) an organic diisocyanate and (c) a chain extender at a ratio that satisfies the following numerical formula (i):

$$1.00 \leq b/(a+c) \leq 1.10 \qquad (i)$$

where a indicates the number of mols of the polyester-polyol, b indicates the number of mols of the organic diisocyanate, and c indicates the number of mols of the chain extender.

The other object is attained by providing laminates composed of thermoplastic polyurethane layers and fibrous base layers, which are characterized in that the thermoplastic polyurethane layers are melt-molded layers of thermoplastic polyurethanes obtainable by reacting (a) a polyester-polyol that satisfies all the following requirements (1) to (4):

(1) its ester group content (number of ester bonds/number of all carbon atoms) is from 0.08 to 0.17;

(2) it has hydroxyl groups of from 2.01 to 2.08 per one molecule;

(3") it has a number average molecular weight of from 1000 to 4000; and (4) it has a crystallization enthalpy (ΔH) of 70 J/g or less, (b) an organic diisocyanate and (c) a chain extender at a ratio that satisfies the following numerical formula (i):

$$1.00 \leq b/(a+c) \leq 1.10 \qquad (i)$$

where a indicates the number of mols of the polyester-polyol, b indicates the number of mols of the organic diisocyanate, and c indicates the number of mols of the chain extender.

The other object is attained by providing a method for producing thermoplastic polyurethanes, which comprises reacting (a) a polyester-polyol that satisfies all the following requirements (1) to (4):

(1) its ester group content (number of ester bonds/number of all carbon atoms) is from 0.08 to 0.17;

(2) it has hydroxyl groups of from 2.01 to 2.08 per one molecule;

(3) it has a number average molecular weight of from 1000 to 7000; and (4) it has a crystallization enthalpy (ΔH) of 70 J/g or less, (b) an organic diisocyanate and (c) a chain extender at a ratio that satisfies the following numerical formula (i):

$$1.00 \leq b/(a+c) \leq 1.10 \qquad (i)$$

where a indicates the number of mols of the polyester-polyol, b indicates the number of mols of the organic diisocyanate, and c indicates the number of mols of the chain extender.

Still the other object is attained by providing a method for producing resilient polyurethane fibers, which comprises melt-spinning a thermoplastic polyurethane obtainable by reacting (a) a polyester-polyol that satisfies all the following requirements (1) to (4):

(1) its ester group content (number of ester bonds/number of all carbon atoms) is from 3.08 to 0.17;

(2) it has hydroxyl groups of from 2.01 to 2.08 per one molecule;

(3') it has a number average molecular weight of from 1000 to 5000; and (4) it has a crystallization enthalpy (ΔH) of 70 J/g or less, (b) an organic diisocyanate and (c) a chain extender at a ratio that satisfies the following numerical formula (i):

$$1.00 \leq b/(a+c) \leq 1.10 \qquad (i)$$

where a indicates the number of mols of the polyester-polyol, b indicates the number of mols of the organic diisocyanate, and c indicates the number of mols of the chain extender, or comprises melt-spinning the thermoplastic polyurethane while forming it by reacting the polyester-polyol (a), the organic diisocyanate (b) and the chain extender at the ratio satisfying the above-mentioned numerical formula (i).

DETAILED DESCRIPTION OF PREFERRED EMBODIMENTS OF THE INVENTION

The polyester-polyol (a) to be used for the production of the thermoplastic polyurethanes of the present invention consists substantially of polyol units and dicarboxylic acid units.

The polyol units constituting the polyester-polyol (a) include, for example, units to be derived from low-molecular diols having two primary hydroxyl groups in one molecule, such as ethylene glycol, diethylene glycol, 1,4-butanediol, 2-methyl-1,3-propanediol, neopentyl glycol, 1,6-hexanediol, 3-methyl-1,5-pentanediol, 2-methyl-1,8-octanediol, 1,9-nonanediol, etc.; and low-molecular polyols having three or more hydroxyl groups in one molecule, such as glycerin, trimethylolpropane, hexanetriol, pentaerythritol, diglycerine, methylglucoxide, etc. The polyester-polyol (a) may comprise one or more of these units. Of these units, preferred are 1,9-nonanediol units as producing polyurethanes with good friction melt resistance and hydrolysis resistance. Also preferred are 3-methyl-1,5-pentanediol units as producing polyurethanes with good cold resistance. Even preferred are trimethylolpropane units as producing polyurethanes with good friction melt resistance and heat resistance.

The dicarboxylic acid units constituting the polyester-polyol (a) include, for example, units to be derived from saturated aliphatic dicarboxylic acids such as glutaric acid, adipic acid, pimelic acid, suberic acid, azelaic acid, sebacic acid, etc.; saturated alicyclic dicarboxylic acids such as cyclohexanedicarboxylic acid, etc.; aromatic dicarboxylic acids such as phthalic acid, terephthalic acid, isophthalic acid, etc.; unsaturated dicarboxylic acids such as maleic acid, fumaric acid, itaconic acid, etc.; halogen-containing dicarboxylic acids such as tetrabromophthalic acid, etc.; ester-forming derivatives and anhydrides of these acids, etc. The polyester-polyol (a) may comprise one or more of these units. If desired, it may optionally contain small amounts of units to be derived from tri-functional or higher polyfunctional polybasic acids such as trimellitic acid, pyromellitic acid, etc. Of these, preferred are units to be derived from adipic acid, azelaic acid and isophthalic acids as producing polyurethanes with better friction melt resistance and hydrolysis resistance.

The ester group content of the polyester-polyol (a) (requirement (1)) must be from 0.08 to 0.17. If the ester group content of the polyester-polyol (a) is less than 0.08, the thermoplastic polyurethanes produced shall have lowered melt-moldability, cold-resistance and resilience restorability. If such thermoplastic polyurethanes are formed into resilient fibers, the time-dependent increase in the pressure of the spinning pack is great so that it is impossible to stably spin the fibers and the resilient fibers obtained are poorly homogeneous. On the other hand, if the ester group content is more than 0.17, the thermoplastic polyurethanes produced shall have lowered friction melt resistance, heat resistance and hydrolysis resistance.

The "ester group content" of the polyester-polyol (a) as referred to herein indicates a value to be obtained by dividing the number of the ester bonds in the polyester-polyol by the number of the total carbon atoms therein.

The number of hydroxyl groups in one molecule of the polyester-polyol (a) (requirement (2)) must be from 2.01 to 2.08 but is preferably from 2.01 to 2.07, more preferably from 2.02 to 2.06. If the number of hydroxyl groups in one molecule of the polyester-polyol (a) is less than 2.01, the thermoplastic polyurethanes produced could not have a sufficiently increased molecular weight so that their melt friction resistance and heat resistance are lowered. On the other hand, if the number of hydroxyl groups in one molecule of the polyester-polyol (a) is more than 2.08, the thermoplastic polyurethanes produced shall have lowered heat resistance while they must be molded at elevated temperatures. Therefore, the thermoplastic polyurethanes are often deteriorated under heat and their melt-moldability is worsened. If such thermoplastic polyurethanes are formed into resilient fibers, they give substances as decomposed and deteriorated under heat during spinning to thereby worsen the spinning stability and the quality of the resilient polyurethane fibers produced is lowered. The polyester-polyol (a) to be employed in the present invention may be, for example, either ① a single polyester-polyol as produced by combining, as the polyol components constituting it, a low-molecular diol component having two primary hydroxyl groups in one molecule and a low-molecular polyol component having three or more hydroxyl groups in one molecule at any desired ratio in such a manner that the number of hydroxyl groups in the polyester-polyol falls within the above-mentioned range, or ② a mixture to be prepared by mixing polyester-diols having two hydroxyl groups in one molecule and polyester-polyols having more than two hydroxyl groups in one molecule at any desired ratio in such a manner that the number of hydroxyl groups in the polyester-polyol falls within the above-mentioned range.

The number average molecular weight of the polyester-polyol (a) (requirement (3)) must be from 1000 to 7000 but is preferably from 1500 to 6000, more preferably from 2000 to 5000. If the number average molecular weight of the polyester-polyol (a) is less than 1000, the properties of the thermoplastic polyurethanes produced are worsened or, that is, their molding strain, compression set, heat resistance and cold resistance are lowered. On the other hand, if the number average molecular weight is more than 7000, the properties of the thermoplastic polyurethanes produced are also worsened or, that is, their melt-moldability and transparency are lowered and the tensile strength of the molded articles comprising them is low.

The thermoplastic polyurethanes of the present invention can be used as raw materials for producing ordinary molded articles, as those for producing resilient fibers and even as those for producing laminates composed of melt-molded layers of polyurethanes and fibrous base layers. Where they are used for producing resilient fibers and laminates, the polyester-polyols constituting the polyurethanes shall have a number average molecular weight falling within different preferred ranges. Precisely, for those for producing resilient polyurethane fibers, the polyester-polyol (a) must have a number average molecular weight falling within a range between 1000 and 5000 but preferably within a range between 1500 and 3000. If it has a number average molecular weight of less than 1000, the properties of the resilient polyurethane fibers produced are worsened or, that is, their heat resistance, hot water resistance and wet heat resistance are worsened. On the other hand, if it has a number average molecular weight of more than 5000, the stability of polyurethanes produced is lowered during spinning them, and the breaking point of the resilient polyurethane fibers produced as well as the homogeneousness thereof is lowered. For those for producing laminates, the polyester-polyol (a) must have a number average molecular weight falling within a range between 1000 and 4000 but preferably within a range between 1500 and 3500. If it has a number average molecular weight of less than 1000, the mechanical properties, the friction melt resistance, the abrasion resistance and the low-temperature characteristics of the melt-molded layers of the thermoplastic polyurethanes produced are lowered. On the other hand, if it has a number average molecular weight of more than 4000, the melt-molded layers of the thermoplastic polyurethanes as produced through extrusion shall have fish eyes and the like spots and it is difficult to stably produce the intended laminates.

The number average molecular weight of the polyester-polyol (a) as referred to herein is calculated on the basis of the hydroxyl value thereof measured in accordance with JIS K 1577.

The crystallization enthalpy ($\Delta H$) of the polyester-polyol (a) (requirement (4)) must be 70 J/g or less. If the polyester-polyol (a) has a crystallization enthalpy ($\Delta H$) of more than 70 J/g, the thermoplastic polyurethanes produced shall have noticeably lowered cold resistance and they are easily cracked at low temperatures (for example, at $-30°$ C.). To make the polyester-polyol (a) have a crystallization enthalpy ($\Delta H$) of 70 J/g or less, for example, employable are ① a method of using, as the polyol component that constitutes the polyester-polyol (a), a low-molecular diol component having a methyl group as the side chain, such as 2-methyl-1,3-propanediol, 3-methyl-1,5-pentanediol, 2-methyl-1,8-octanediol or the like, singly or as combined with a linear diol component; and ② a method of using, as the dicarboxylic acid component that constitutes the polyester-polyol (a), a combination of an aromatic dicarboxylic acid component such as isophthalic acid, orthophthalic acid, terephthalic acid or the like and an aliphatic dicarboxylic acid component.

The crystallization enthalpy ($\Delta H$) of the polyester-polyol (a) as referred to herein can be measured with a scanning differential calorimeter. Concretely, it indicates the data as measured in accordance with the method illustrated in the examples to be mentioned hereinunder.

The polyester-polyol (a) to be used for producing the thermoplastic polyurethanes of the present invention may be either a single polyester-polyol or a mixture of two or more polyester-polyols. Anyway, the polyester-polyol (a), being either a single polyester-polyol or a mixture of two or more polyester-polyols, shall satisfy all the above-mentioned requirements (1) to (4) as a whole (or aggregate) of itself.

The polyester-polyol (a) can be obtained by polycondensation of the above-mentioned polyol component and the above-mentioned dicarboxylic acid component through known interesterification, direct esterification, etc. The polycondensation to produce polyester-polyols can be conducted in the presence of a catalyst. The catalyst preferably includes titanium catalysts and tin catalysts.

Examples of usable titanium catalysts include titanic acid, tetraalkoxy titanium compounds, titanium acylate compounds, titanium chelate compounds, etc. More concretely mentioned are tetraalkoxy titanium compounds such as tetraisopropyl titanate, tetra-n-butyl titanate, tetra-2-ethylhexyl titanate, tetrastearyl titanate, etc.; titanium acylate compounds such as polyhydroxytitanium stearate, polyisopropoxytitanium stearate, etc.; titanium chelate compounds such as titanium acetylacetate, triethanolamine titanate, titanium ammonium lactate, titanium ethyl lactate, titanium octylene glycol, etc.

Examples of tin catalysts include dialkyl tin diacetates, dialkyl tin dilaurates, dialkyl tin bismercaptocarboxylates, etc. More concretely mentioned are dibutyl tin diacetate, dibutyl tin dilaurate, dibutyl tin bis(ethoxybutyl 3-mercaptopropionate), etc.

The amount of the titanium catalyst, if used, is not specifically defined but can be varied depending on the reaction condition. In general, however, it is preferably approximately from 0.1 to 50 ppm, more preferably approximately from 1 to 30 ppm, relative to the total weight of the reactants that are used for producing the intended polyester-polyol. The amount of the tin catalyst, if used, is not also specifically defined but can be varied depending on the reaction condition. In general, however, it is preferably approximately from 1 to 200 ppm, more preferably approximately from 5 to 100 ppm, relative to the total weight of the reactants that are used for producing the intended polyester-polyol.

Where polyester-polyols are produced in the presence of a titanium catalyst, it is desirable that the titanium catalyst remaining in the polyester-polyols produced is deactivated. If polyester-polyols containing some non-deactivated titanium catalyst are used to produce thermoplastic polyurethanes, the characteristics, such as hot water resistance, dry heat resistance and wet heat resistance, of the thermoplastic polyurethanes produced are often worsened.

To deactivate the titanium catalyst remaining in polyester-polyols, for example, employable are ① a method of bringing the polyester-polyols into contact with water under heat to thereby deactivate the titanium catalyst remaining therein, and ② a method of treating the polyester-polyols with phosphorus compounds such as phosphoric acid, phosphates, phosphorous acid, phosphites, etc. Where the titanium catalyst is deactivated through contact with water, 1% by weight or more of water may be added to the polyester-polyols and heated at from 70 to 150° C., preferably from 90 to 130° C. for from 1 to 3 hours. The deactivation of the titanium catalyst can be effected at normal pressure or under elevated pressure. It is desirable that the pressure in the system is reduced after the deactivation of the titanium catalyst since water as added to the system for the deactivation can be removed.

The organic diisocyanate (b) to be used for producing the thermoplastic polyurethanes of the present invention is not specifically defined but may be any and every organic diisocyanate that is generally used for producing ordinary polyurethanes. Preferred are organic diisocyanates having a molecular weight of 500 or less. Organic diisocyanates employable in the present invention include, for example, aromatic diisocyanates such as 4,4'-diphenylmethane diisocyanate, p-phenylene diisocyanate, toluylene diisocyanate, 1,5-naphthylene diisocyanate, 3,3'-dichloro-4,4'-diphenylmethane diisocyanate, xylylene diisocyanate, etc.; aliphatic and alicyclic diisocyanates such as hexamethylene diisocyanate, isophorone diisocyanate, 4,4'-dicyclohexylmethane diisocyanate, hydrogenated xylylene diisocyanate, etc. One or more of these organic diisocyanates can be used in the present invention. Of these, preferred are 4,4'-diphenylmethane diisocyanate and p-phenylene diisocyanate. If desired, small amounts of tri-functional or higher poly-functional polyisocyanates, such as triphenylmethane triisocyanate, etc., can be added to the organic diisocyanate (b).

The chain extender (c) to be used in producing the thermoplastic polyurethanes of the present invention is not specifically defined but may be any and every one that is generally used in producing ordinary polyurethanes. Preferred are low-molecular compounds having a molecular weight of 300 or less and having two or more active hydrogen atoms capable of reacting with isocyanato group in the molecule. For example, mentioned are diols such as ethylene glycol, 1,4-butanediol, 1,5-pentanediol, 1,6-hexanediol, 1,7-heptanediol, 1,8-octanediol, 1,9-nonanediol, 1,4-bis(β-hydroxyethoxy)benzene, 1,4-cyclohexanediol, bis(β-hydroxyethyl) terephthalate, xylylene glycol, etc.; diamines such as hydrazine, ethylenediamine, propylenediamine, xylylenediamine, isophoronediamine, piperazine, piperazine derivatives, phenylenediamine, tolylenediamine, xylenediamine, adipic acid dihydrazide, isophthalic acid dihydrazide, etc.; aminoalcohols such as aminoethyl alcohol, aminopropyl alcohol, etc. One or more of these can be used in the present invention. Of these, especially preferred are aliphatic diols such as ethylene glycol, 1,4-butanediol, 1,5-pentanediol, 1,6-hexanediol, 1,7-heptanediol, 1,8-octanediol, 1,9-nonanediol, etc. It is more preferable to use, as the chain extender (c), a mixture comprising 1,4-butanediol and aliphatic diols of the following general formula (B), of which the 1,4-butanediol content is from 70 to 98 mol %. The mixture produces thermoplastic polyurethanes with better melt-moldability. Especially preferred is a mixture comprising 1,4-butanediol and 1,9-nonanediol.

$$HO-(CH_2)n-OH \tag{B}$$

wherein n represents an integer of from 5 to 9.

To produce the thermoplastic polyurethanes of the present invention, the polyester-polyol (a), the organic diisocyanate (b) and the chain extender (c) all mentioned above are reacted at a ratio that satisfies the following numerical formula (i):

$$1.00 \leq b/(a+c) \leq 1.10 \tag{i}$$

wherein a indicates the number of mols of the polyester-polyol, b indicates the number of mols of the organic diisocyanate, and c indicates the number of mols of the chain extender.

If the ratio of b/(a+c) in formula (i) is less than 1.00, the heat resistance, the friction melt resistance and the compression set of the thermoplastic polyurethanes produced are unsatisfactory. On the other hand, if the ratio of b/(a+c) is more than 1.10, the melt-moldability of the thermoplastic polyurethanes produced and the stability thereof during spinning are poor. It is desirable that the ratio of b/(a+c) falls between 1.005 and 1.10, more preferably between 1.005 and 1.05, as producing thermoplastic polyurethanes with good characteristics of heat resistance, compression set, melt-moldability and stability during spinning.

To produce the thermoplastic polyurethanes of the present invention, if desired, small amounts of other high-molecular polyols such as polycarbonate diols, etc. may be added to the reaction system in addition to the above mentioned polyester-polyol (a).

The polyurethanation to produce the thermoplastic polyurethanes of the present invention can be conducted in the presence of urethanating tin catalysts. It is especially desirable to conduct the polyurethanation in the presence of an urethanating tin catalyst in an amount of from 0.5 to 15 ppm, in terms of the tin atom, based on the total weight of the raw materials used, as producing thermoplastic polyurethanes having a high molecular weight. Since the thermoplastic polyurethanes as produced in the presence of urethanating tin catalysts can have a molecular weight at a sufficiently high level even after having been melt-molded, the molded articles of such polyurethanes can effectively exhibit the intrinsic physical properties of the thermoplastic polyurethanes. Where such thermoplastic polyurethanes are formed into fibers, the spinnability and the windability of the fibers are good while the adhesion of fibers to each other during spinning and winding is reduced. Such high-molecular thermoplastic polyurethanes can be formed into resilient polyurethane fibers with good mechanical characteristics and heat resistance. However, the amount of the urethanating tin catalyst used is more than 15 ppm in terms of the tin atom, the hydrolysis resistance and the heat stability of the thermoplastic polyurethanes produced will be often lowered.

The urethanating tin catalyst includes, for example, tin acylate compounds and tin mercaptocarboxylates, such as tin octylate, monomethyltin mercaptoacetate, monobutyltin triacetate, monobutyltin monooctylate, monobutyltin monoacetate, monobutyltin maleate, monobutyltin benzyl maleate, monooctyltin maleate, monobutyltin benzyl maleate, monooctyltin thiodipropionate, monooctyltin tris(isooctyl thioglycolate), monophenyltin triacetate, dimethyltin maleate, dimethyltin bis(ethylene glycol monothioglycolate), dimethyltin bis(mercaptoacetate), dimethyltin bis(3-mercaptopropionate), dimethyltin bis(isooctyl mercaptoacetate), dibutyltin diacetate, dibutyltin dioctanoate, dibutyltin distearate, dibutyltin dilaurate, dibutyltin maleate, dibutyltin maleate polymers, dibutyltin maleate esters, dibutyltin bis(mercaptoacetate), dibutyltin bis(alkyl mercaptoacetates), dibutyltin bis(alkoxybutyl 3-mercaptopropionates), dibutyltin bis(octylthioglycol esters), dibutyltin bis(3-mercaptopropionate), dioctyltin maleate, dioctyltin maleate esters, dioctyltin maleate polymers, dioctyltin dilaurate, dioctyltin bis(isooctyl mercaptoacetate), dioctyltin bis(isooctyl thioglycolate), dioctyltin bis(3-mercaptopropionate), etc. One or more of these can be used in the present invention. Of these, preferred are dialkyltin diacylates such as dibutyltin distearate, dibutyltin dilaurate, etc.; dialkyltin bismercaptocarboxylate esters such as dibutyltin bis(3-alkoxybutyl 3-mercaptopropionates) etc.

The method for producing the thermoplastic polyurethanes is not specifically defined. The polyurethanes can be produced from the polyester-polyol (a), the organic diisocyanate (b), the chain extender (c) and optionally other components such as those mentioned hereinabove, to which can be applied known urethanation techniques such as melt polymerization, solution polymerization, etc. In particular, it is preferable to subject the components to melt polymerization substantially in the presence of no solvent to obtain the intended thermoplastic polyurethanes. Especially preferred is continuous melt polymerization using multi-screw extruders.

During or after the polymerization to obtain the thermoplastic polyurethanes of the present invention, it is possible to add thereto one or more additives that are generally used in the production of ordinary polyurethanes, such as heat stabilizers, antioxidants, ultraviolet absorbents, flame retardants, lubricants, colorants, hydrolysis inhibitors, nucleating agents, weather resistance improving agents, tackifiers, antifungal agents, etc.; and also fibrous fillers such as glass fibers, and powdery fillers such as talc, silica, etc.

The thermoplastic polyurethanes of the present invention shall have a melt viscosity at 220° C. of 40,000 ps or less. If they have a melt viscosity (at 220° C.) of more than 40,000 ps, they must be molded through melt extrusion at 230° C. or higher, at which, however, the thermoplastic polyurethanes being molded are deteriorated under heat to give molded articles with worsened properties of lowered heat resistance, friction melt resistance and compression set. The thermoplastic polyurethanes having a melt viscosity (at 220° C.) of 30,000 ps or less are preferred, as having better melt-moldability.

After having been melt-molded, the thermoplastic polyurethanes of the present invention may be left only at room temperature to give molded articles with good characteristics of high heat resistance, friction melt resistance, hydrolysis resistance and compression set. After having been melt-molded, however, it is desirable to subject the molded articles to additional heat treatment by which such characteristics of the articles are much more improved. It is desirable that the heat treatment is conducted at from 60° C. to 120° C.

The molded articles comprising the thermoplastic polyurethanes of the present invention have a content of 30% by weight or more that is insoluble in N,N-dimethylformamide when dipped therein at 40° C. for 24 hours (the content is hereinafter referred to as a DMF-insoluble content). The molded articles having a DMF-insoluble content of 30% by weight or more have good heat resistance, friction melt resistance and compression set. Those having a DMF-insoluble content of 50% by weight or more are more preferred, as having much more improved characteristics of the above.

Since the thermoplastic polyurethanes of the present invention have good characteristics of high heat resistance, friction melt resistance, cold resistance, hydrolysis resistance and compression set and additionally have good melt-moldability, they are useful as raw materials for various uses in tubes, films, sheets, belts, hoses, various rolls, screens, casters, gears, packing materials, car parts, squeegees, cleaning blades for duplicators, snowplows, chains, linings, solid tires, shock absorbers, shock controllers, soles, sports shoes, markers, binders, adhesives, artificial leathers, machine parts, etc.

To produce the resilient polyurethane fibers of the present invention from the thermoplastic polyurethanes mentioned above, any of melt-spinning, dry-spinning and wet-spinning systems can be employed. Of these, preferred is a melt-spinning system in view of the good physical properties of the resilient polyurethane fibers to be produced and of the simplicity of the system and the high producibility therewith.

To produce the resilient polyurethane fibers through melt-spinning, for example, preferably employed are ① a method of previously preparing thermoplastic polyurethanes by using the above-mentioned polyester-polyol (a), organic diisocyanate (b) and chain extender (c) at the ratio that satisfies the above-mentioned numerical formula (i), followed by melt-spinning the resulting thermoplastic polyurethanes; and ② a method of producing thermoplastic polyurethanes by melt-polymerizing the above-mentioned polyester-polyol (a), organic diisocyanate (b) and chain extender (c) at the ratio that satisfies the above-mentioned numerical formula (i) white directly spinning the melts of the resulting thermoplastic polyurethanes through spinnerets.

In consideration of the physical properties of the fibers to be obtained and of the easiness in the melt-spinning operation, the melt-spinning temperature is preferably 250° C. or lower, more preferably falls between 200° C. and 240° C. After having been spun, the resilient polyurethane fibers are preferably ripened under heat at from 50° C. to 100° C. to make them have much more improved properties. The kind and the type of the spinning device to be employed for the melt-spinning are not specifically defined, and any conventional melt-spinning device that is generally employed for producing resilient polyurethane fibers can be used.

The degree of polymerization of the thermoplastic polyurethanes that constitute the resilient polyurethane fibers of the present invention is not specifically defined. However, in consideration of the dry heat resistance and the wet heat resistance of the resilient polyurethane fibers, the degree of polymerization is preferably such that the resilient polyurethane fibers as dissolved in N,N-dimethylformamide containing 1% by weight of n-butylamine at a concentration of 0.5 dl/g may have a logarithmic viscosity at 30° C. of 0.5 dl/g or more, especially preferably 0.7 dl/g or more. In particular, it is especially preferable to produce the resilient polyurethane fibers of the present invention from thermoplastic polyurethanes with a high degree of polymerization to such an extent that the resulting fibers do not dissolve at all or dissolve only partly in N,N-dimethylformamide containing 1% by weight of n-butylamine, since the resilient polyurethane fibers from the thermoplastic polyurethanes with such a high degree of polymerization can have much more excellent dry heat resistance and wet heat resistance.

The fineness of the single fiber of the resilient polyurethane fibers of the present invention is not specifically defined and may be determined suitably depending on the use of the fibers. In general, the fineness of the single fiber is preferably approximately from 10 to 100 deniers. The resilient polyurethane fibers of the present invention may be either in the form of monofilaments or multifilaments. For the latter multifilaments, the number of the filaments and the number of the total deniers are not specifically defined but may be determined suitably.

The cross-sectional profiles of the resilient polyurethane fibers of the present invention are not also specifically defined but may be any of circular, square, hollow-shaped, triangular, oval, tabular, multi-leafy, V-shaped, T-shaped, arrayed and other modified cross-sections. To produce various products using the resilient polyurethane fibers of the present invention, the fibers may be used singly or as combined with other fibers in any desired modes.

The use of the resilient polyurethane fibers of the present invention is not specifically defined and the fibers may be applied to various uses. Utilizing their resilient characteristics, the fibers can be used in sports goods such as swimming suits and trunks, ski wear, cycling wear, leotards, etc.; clothes such as lingerie, foundation garments, underwear, etc.; accessories such as panty hose, socks, supporters, hats, gloves, etc.; power nets; medical supplies such as bandages, artificial vessels, etc.; and also non-clothing products such as gut for tennis rackets, base yarns for car sheets to be molded through integrated molding, yarns for coating metals for robot arms, etc. Above all, the resilient polyurethane fibers of the present invention are extremely effectively used in sports goods and clothes, as having excellent characteristics of high heat resistance, wet heat resistance, hot water resistance, restorable resiliency and homogeneousness.

Using the thermoplastic polyurethanes mentioned above, the laminates of the present invention can be produced, which comprise melt-molded layers of the thermoplastic polyurethanes and fibrous base layers. To produce the laminates, for example, employable is a method of laminating hot melts of the thermoplastic polyurethanes over a fibrous base layer. While laminating the thermoplastic polyurethane layer over the fibrous base layer, the surface of the thermoplastic polyurethane layer may be patterned to have leather-like crepe patterns or matted patterns. The laminates with such patterns can have good appearance, hand and feel which are extremely similar to those of natural leather.

Though not limited, examples of the method for producing the laminates of the present invention include ① a method of melt-extruding a thermoplastic polyurethane onto a release paper to form a filmy polyurethane layer thereon while pressing the polyurethane film layer against a fibrous base layer with a pressure roll or the like and while patterning the surface of the polyurethane layer to make it have crepe patterns or matted patterns; ② a method of melt-extruding a thermoplastic polyurethane onto the surface of a pressure roll to form a filmy polyurethane layer thereon while pressing the polyurethane film layer against a fibrous base layer and while patterning the surface of the polyurethane layer to make it have crepe patterns or matted patterns; and ③ a method of melt-extruding a thermoplastic polyurethane onto a fibrous base layer to form a filmy polyurethane layer thereon while patterning the surface of the polyurethane layer, using a pressure roll or the like, to make the surface have crepe patterns or matted patterns before the polyurethane is solidified. Prior to carrying out these methods, an adhesive or any other adhesion-improving agent may be previously applied to the surface of the fibrous base layer by coating or dipping, by which the adhesion between the polyurethane layer and the fibrous base layer can be enhanced.

In order to make the laminates have good abrasion resistance, scratch resistance, mechanical characteristics, water-proofness and cold resistance while not making them lose their softness and flexibility, the thickness of the polyurethane layer to be laminated on the fibrous base layer is preferably from 10 to 800 $\mu$m, more preferably from 30 to 500 $\mu$m. If the polyurethane layer is too thin, its abrasion resistance and scratch resistance are lowered and its adhesion to the fibrous base layer is also lowered. However, if it is too thick, the softness and the flexibility of the laminate are poor and the appearance, hand and feel thereof will then be worsened.

The fibrous base layer constituting the laminates of the present invention may be any of woven fabrics, knitted fabrics, non-woven fabrics and monolithic combinations thereof which are generally used in ordinary synthetic leathers and artificial leathers. It is desirable that the fibrous base layer is made of natural fibers such as cotton, hemp, wool, etc.; regenerated fibers such as typically rayon, acetate, etc.; synthetic fibers such as nylon, vinylon, polyester fibers, acrylic fibers, polyolefin fibers, polyurethane fibers, etc.; and combinations of these.

In order make the laminates of the present invention have a supple hand like natural leathers, it is desirable that the fibers constituting the fibrous base are extrafine fibers having a fineness of 0.3 deniers or less, preferably 0.1 deniers or less. In this case, it is preferable that the extrafine fibers are so-called porous fibers having many pores in each fiber or in the bundles of the fibers in the direction of the axes of the fibers. Such porous extrafine fibers can be obtained, for example, by a method of preparing mixed fibers or composite fibers through sea-island mode or block mode mix-spinning or composite-spinning of two or more polymers each having a different solubility in one and the same solvent, followed by removing the polymer having a larger solubility from the resulting mixed fibers or composite fibers through solvent extraction; or a method of preparing mixed fibers or composite fibers through sea-island mode or block mode mix-spinning or composite-spinning of two or more polymers which are decomposed by one and the same decomposing agent at different decomposing rates, followed by removing the polymer having a higher decomposing rate from the resulting mixed fibers or composite fibers through decomposition; or a method of preparing mixed fibers or composite fibers through sea-island mode or block mode mix-spinning or composite-spinning of two or more polymers which are poorly compatible with each other, followed by mechanically or chemically fibrillating the resulting mixed fibers or composite fibers to thereby partly peeling them at the interfaces between the different polymers.

More concretely, mixed fibers or composite fibers to be prepared by mix-spinning or composite-spinning of nylon and polystyrene or polyester and polystyrene are extracted With toluene to remove polystyrene from the fibers; or mixed fibers or composite fibers to be prepared by mix-spinning or composite-spinning of polyester and polyethylene are treated with decalin or the like to remove polyethylene from the fibers. However, the fibrous base layer may be made of ordinary fibers having an ordinary fineness of from 0.3 to 5 deniers, apart from such extrafine fibers.

The thickness of the fibrous base layer may be suitably varied, depending on the use of the laminates. In general, however, it is desirable that the fibrous base layer to be in the laminates of the present invention has a thickness of approximately from 0.5 to 5 mm, preferably approximately from 1 to 2 mm, in consideration of the softness, the flexibility and the feel of the laminates.

In order to make the laminates of the present invention have a natural leather-like hand, a polyurethane elastomer or the like elastic polymer may be infiltrated into the fibrous base layer. In this case, it is desirable that the elastic polymer as infiltrated into the fibrous base layer has a porous structure as giving laminates having a hand much more similar to the hand of natural leather. In order to infiltrate such a polyurethane elastomer or the like elastic polymer into the fibrous base layer to have a porous structure therein, for example, employable is a method of applying a solution of an elastic polymer to the fibrous base layer followed by wet-solidifying the elastic polymer in the base layer. If the fibrous base layer contains such a polyurethane elastomer or the like elastic polymer as infiltrated therein in that manner, the adhesion between the fibrous base layer and the polyurethane layer laminated thereon is much enhanced.

One or both surfaces of the fibrous base layer may be raised or embossed whereby the adhesion of the substrate to the polyurethane layer laminated thereon is enhanced and the laminate can have back skin-like appearance. One or both surfaces of the fibrous base layer may be under-coated with a porous and/or non-porous coat layer of an elastic or non-elastic polymer, prior to the lamination of the polyurethane layer thereon. If desired, the surface of the under-coat layer may be roughened with sand paper or the like or may also be embossed with a embossing roll or the like. The under-coat layer may be formed on one or both surfaces of the fibrous base layer as a continuous or discontinuous layer.

In the laminate of the present invention, the polyurethane layer may be directly on the fibrous base layer or via an under-coat layer made of an elastic polymer or the like. In the laminate of the present invention, the polyurethane layer may be laminated on either one surface or both surfaces of the fibrous base layer, or three or more polyurethane layers and fibrous base layers may be alternately laminated. Such structures of the laminates may be suitably selected in accordance with the use thereof.

The total thickness of the laminate of the present invention may be suitably varied depending on the use thereof. In general, however, it is desirable that the thickness is approximately from 0.5 to 5 mm, more preferably approximately from 1 to 2 mm, in consideration of the softness, the flexibility, the mechanical properties and the durability of the laminate.

As having various excellent mechanical properties of high friction melt resistance, abrasion resistance, bleeding resistance, whitening resistance and tensile strength along with other various excellent characteristics of high durability, cold resistance, softness and flexibility and a good feel to the skin, the laminates of the present invention can be effectively used in clothes, sports goods, shoes, bags and boxes such as briefcases, handbags, etc., interior decorations in houses and buildings, decorative materials for furniture, etc.

EXAMPLES

The present invention is described concretely by means of the following examples, which, however, are not intended to restrict the scope of the present invention. In the following reference examples, examples and comparative examples, the number average molecular weight, the crystallization enthalpy ($\Delta H$), the melt viscosity, the melt-moldability, the hardness, the compression set, the heat resistance, the friction melt resistance, the cold resistance, the hydrolysis resistance, the DMF-insoluble content, the stability during spinning, the logarithmic viscosity, the heat resistance, the hot water resistance, the wet heat resistance, the degree of resilience restoration, the homogeneousness, the abrasion resistance (Taber's abrasion resistance) and the degree of bleeding-out/whitening of the samples were measured and evaluated according to the methods mentioned below.

Number Average Molecular Weight of Polyester-polyol

The number average molecular weight of each polyester-polyol sample was calculated on the basis of its hydroxyl value as measured in accordance with JIS K 1577.

Crystallization Enthalpy ($\Delta H$) of Polyester-polyol

Using a scanning differential calorimeter (Rigaku Thermal Analysis Station TAS10 Model, produced by Rigaku Denki Co.), the crystallization enthalpy ($\Delta H$) of each polyester polyol sample was measured. The amount of the sample was about 10 mg. The quantity of heat of the sample was measured in a nitrogen stream (100 ml/min) under the conditions shown in Table 1 below. From the peak area after the step 3, the crystallization enthalpy ($\Delta H$) of the sample was obtained.

TABLE 1

|  | Temperature at starting point (° C.) | Temperature at end point (° C.) | Retention time at end point temperature (min) | Heating or cooling rate (° C./min) |
|---|---|---|---|---|
| Step 1 | room temperature | 100 | 3 | 100 |
| Step 2 | 100 | −100 | 1 | 10 |
| Step 3 | −100 | 100 | 0 | 10 |

Melt Viscosity of Polyurethane

Using an overhead flow tester produced by Shimazu Seisakusho Co., the melt viscosity of each polyurethane sample that had been previously dried under reduced pressure (at 1300 Pa or lower) at 50° C. for 2 hours was measured at a load of 50 kgf and at a temperature of 220° C. through a nozzle having a dimension of 1φ×10 mm.

Melt-moldability of Polyurethane

Using an overhead flow tester produced by Shimazu Seisakusho Co., the melt viscosity of each polyurethane sample, after having been left therein at 215° C. for a period of retention time of 6 minutes and 60 minutes, was measured at a load of 50 kgf and at the same temperature through a nozzle having a dimension of 1φ×10 mm. The increase in the melt viscosity was obtained from the following equation, which indicates the melt-moldability of the sample.

$$\text{Increase in Melt Viscosity } (\%) = [(\eta - \eta_0)/\eta_0] \times 100$$

wherein $\eta_0$ is the melt viscosity (poise) of the sample as left in the tester for a period of retention time of 6 minutes, and $\eta$ is the melt viscosity (poise) of the sample as left in the tester for a period of retention time of 60 minutes.

Hardness of Polyurethane

A disc-wise molded article having a thickness of 6 mm, as obtained by injection molding of each polyurethane sample, was left at room temperature (23° C.) for 1 week or was annealed at 80° C. for 24 hours. The Shore hardness of the article was measured, using a Shore A hardness tester.

Compression Set of Polyurethane

A disc-wise molded article having a thickness of 12 mm, as obtained by injection molding of each polyurethane sample, was left at room temperature (23° C.) for 1 week or was annealed at 80° C. for 24 hours. The degree of compression set of the article was measured in accordance with the method of JIS K 6301 (heat treatment: at 70° C. for 22 hours).

Heat Resistance of Film

A film having a thickness of 0.1 mm, as obtained by extrusion molding of each polyurethane sample, was left at room temperature (23° C.) for 1 week or was annealed at 80° C. for 24 hours. The tensile strength of the film at its breaking point at 100° C. was measured in accordance with the method of JIS K 7206, which indicates the heat resistance of the sample.

Friction Melt Resistance of Film and Laminate

A film having a thick film having a thickness of 0.5 mm, as obtained by extrusion molding of each polyurethane sample, was left at room temperature (23° C.) for 1 week or was annealed at 80° C. for 24 hours. A strip sample (3 cm×6 cm) was cut out of the film. This was attached to a cherry wood roller (diameter: 73 mm, width: 26 mm) rotating at 1800 rpm, for 2 seconds under a load of 1.5 lb, whereupon the area (cm²) of the sample as melted under friction was measured and the molten surface of the sample was observed with the naked eye. On the basis of the criteria shown in Table 2 and Table 3 below, the sample was ranked. Again, a strip sample (3 cm×6 cm) was cut out of each laminate and the polyurethane layer of the sample was tested and evaluated in the same manner.

TABLE 2

| Rank | Area Melted under Friction (cm²) |
| --- | --- |
| 5: | Less than 1 cm² |
| 4: | From 1 cm² to 2 cm² |
| 3: | From more than 2 cm² to 3 cm² |
| 2: | From more than 3 cm² to 4 cm² |
| 1: | More than 4 cm² |

TABLE 3

| Rank | Condition of Surface Melted under Friction |
| --- | --- |
| ○: | Good with almost no melt under friction. |
| Δ: | Somewhat melted under friction. |
| X: | Bad with much melt under friction. |

Cold Resistance of Film

A film having a thickness of 0.3 mm, as obtained by extrusion molding of each polyurethane sample, was left at room temperature (23° C.) for 1 week or was annealed at 80° C. for 24 hours. A test piece was cut out of the film, and its dynamic viscoelasticity was measured at a frequency of 11 Hz. The temperature (Tα) at which the test piece shows the highest loss of dynamic modulus of elasticity (E") was measured, which indicates the cold resistance of the film.

Hydrolysis Resistance of Film

A film having a thickness of 0.3 mm, as obtained by extrusion molding of each polyurethane sample, was left at room temperature (23° C.) for 1 week or was annealed at 80° C. for 24 hours. A test piece sample was cut out of the film. This was left at 70° C. and at 95% RH for 3 weeks. Before and after thus aged, the tensile strength of the sample at its breaking point was measured. The retention (%) of the tensile strength of the thus-aged sample at its breaking point, relative to the tensile strength of the non-aged sample at its breaking point, was obtained from the following equation, which indicates the hydrolysis resistance of the sample.

$$\text{Hydrolysis Resistance } (\%) = (T/T_0) \times 100$$

wherein $T_0$ is the tensile strength of the original non-aged sample at its breaking point (kgf/cm²), and T is the tensile strength of the aged sample at its breaking point (kgf/cm²).

DMF-insoluble Content of Film

A film having a thickness of 0.1 mm, as obtained by extrusion molding of each polyurethane sample, was left at room temperature (23° C.) for 1 week or was annealed at 80° C. for 24 hours. This was dried at 50° C. under reduced pressure (at 1300 Pa or lower) for 48 hours. About 1 g of the film was dipped in 40 ml of N,N-dimethylformamide (DMF) at 40° C. for 24 hours, and the insoluble solid recovered. The thus-recovered insoluble solid was dried at 50° C. under reduced pressure (at 1300 Pa or lower) for 48 hours, and then its weight was measured. The DMF-insoluble content of the film was calculated in accordance with the following equation.

$$\text{DMF-insoluble Content } (wt.\%) = (W_1/W_0) \times 100$$

wherein $W_0$ is the weight of the original sample prior to being dipped in DMF, and $W_1$ is the weight of the insoluble solid.

Stability during Spinning

Using a single-screw extruder, each polyurethane sample was spun continuously for one week at a spinning temperature of from 200° C. to 240° C. in the same manner as in the following examples or comparative examples, whereupon the increase in the pressure in the spinning pack (sand mesh: #60 to #80) was measured with a pressure gauge. The stability of the sample during its spinning was evaluated on the basis of the criteria shown in Table 4 below.

TABLE 4

Criteria for Evaluation of Stability during Spinning

○: The continuous spinning was possible with almost no increase in the pressure in the spinning pack (increase in pressure: 4 kg/cm² or less).
Δ: The continuous spinning was difficult because of the increase in the pressure in the spinning pack (increase in pressure: from more than 4 kg/cm² to less than 8 (kg/cm²).
X: The continuous spinning was impossible because of the great increase in the pressure in the spinning pack (increase in pressure: 8 kg/cm² or more).

Logarithmic Viscosity of Resilient Fibers

A sample comprising resilient polyurethane fibers was dissolved in N,N-dimethylformamide containing 1% by weight of n-butylamine, at a concentration of 0.5 g/dl, and left at 20° C. for 24 hours. Using an Ubbelohde's viscometer, the dropping time of the resulting solution at 30° C. was measured, from which the logarithmic viscosity of the sample was calculated in accordance with the following equation.

Logarithmic Viscosity of Resilient Polyurethane Fibers=$\{(ln(t/t_0)\}/c$ wherein t is the flowing time (second) of the sample solution, $t_0$ is the flowing time (second) of N,N-dimethylformamide containing 1% by weight of n-butylamine, and c is the concentration of the sample (g/dl).

Heat Resistance of Resilient Fibers

A sample comprising resilient polyurethane fibers was heated at a heating rate of 3° C./min, while being stretched by 100%, and the temperature at which the fibers were cut was measured. The temperature thus measured indicates the heat resistance of the sample.

Hot Water Resistance of Resilient Fibers

A sample comprising resilient polyurethane fibers was fixed to a wood frame, while being stretched by 200%, and subjected to dry heat treatment, using a hot air drier, at 140° C. for 2 minutes. Next, this was dipped in hot water at 130° C. for 30 minutes, using an autoclave. After having been taken out of the autoclave, the stress of the sample which was being still stretched by 200% was measured with an Instron tensile tester ("Instron 4501", produced by Instron Co.) Its stress (R) (g/80 d) thus measured indicates the hot water resistance of the sample.

Wet Heat Resistance of Resilient Fibers

A sample comprising resilient polyurethane fibers was left at 70° C. and 95% RH for 5 weeks. Before and after the aging, the breaking strength of the sample was measured in accordance with JIS L 1013. The retention of the breaking strength of the thus-aged sample, relative to the breaking strength of the non-aged original sample, was obtained from the following equation, which indicates the wet heat resistance of the sample.

Retention of Breaking Strength (%)=$(T/T_0) \times 100$ wherein T is the breaking strength of the aged sample (g/d), and $T_0$ is the breaking strength of the original non-aged sample (g/d).

Degree of Restoration of the Resiliency of Resilient Fibers

A sample comprising resilient polyester fibers was left at room temperature for 2 minutes, while being stretched by 300%. After the tension was removed, the sample was left as it was for 2 minutes. The degree of its resiliency as restored was calculated according to the following equation.

Degree of Restoration of Resiliency (%)=$\{1-(L-L_0)/L_0\} \times 100$ wherein L is the length (mm) of the sample as left for 2 minutes after removal of the tension, and $L_0$ is the length (mm) of the non-stretched original sample.

Homogeneousness of Resilient Fibers

A sample having a length of 50 m was collected from resilient polyurethane fibers obtained through melt-spinning. A thickness measuring device (Keisokuki Evenness Tester Model KEP-80C, produced by Keisokuki Kogyo Co.) was slid over the sample in its lengthwise direction to check the unevenness, if any, in the thickness of the sample. The homogeneousness of the sample was evaluated in accordance with the criteria shown in Table 5 below.

TABLE 5

Criteria for Evaluation of Homogeneousness of Resilient Polyurethane Fibers

○: The unevenness in the thickness of fibers was 1% or less.
Δ: The unevenness in the thickness of fibers was from more than 1% to less than 3%.
X: The unevenness in the thickness of fibers was 3% or more.

Abrasion Resistance of Laminate (based on the amount of Taber's abrasion)

The amount of Taber's abrasion of each laminate sample was measured in accordance with JIS K 7204. Precisely, a disc sample having a diameter of 12 cm was cut out of each polyurethane laminate and subjected to a Taber's abrasion resistance test, in which a friction wheel (H-22) was attached to the polyurethane layer of the disc sample under a load of 1 kgf while the disc sample was rotated for a total of 1000 revolutions. The weight (g) of the disc sample after the abrasion test was subtracted from the weight (g) of the original disc sample before the test to obtain the amount of Taber's abrasion of the sample (the weight of the sample as decreased by the abrasion).

Bleeding-out/whitening Condition

Each polyurethane laminate sample was heated at 80° C. continuously for 1 week, and the outward appearance of the sample after the heat treatment was observed with the naked eye. Samples with no bleeding-out/whitening appearance were marked as "○"; those with some but not so much bleeding-out/whitening appearance were as "X"; those with relatively much bleeding-out/whitening appearance were as "XX"; and those with extremely significant bleeding-out/whitening appearance were as "XXX".

Abbreviations for the compounds as referred to in the following reference examples, examples and comparative examples are mentioned below.

| Abbreviation | Compound |
|---|---|
| EG: | Ethylene Glycol |
| PG: | 1,2-Propylene Glycol |
| BD: | 1,4-Butanediol |
| ND: | 1,9-Nonanediol |
| MPD: | 3-Methyl-1,5-pentanediol |
| TMP: | Trimethylolpropane |
| Ad: | Adipic Acid |
| AZ: | Azelaic Acid |
| Sb: | Sebacic Acid |
| IPA: | Isophthalic Acid |
| MDI: | 4,4'-Diphenylmethane Diisocyanate |
| DBA: | Dibutyltin Diacetate |
| DBL: | Dibutyltin Dilaurate |

Reference Example 1

4200 g of ND, 3098 g of MPD and 6716 g of Ad were put into a reactor and subjected to esterification at normal pressure and at 200° C. while removing water produced from the container through distillation. After the reaction product had an acid value of 30 or less, 180 mg of a titanium catalyst for polycondensation, tetraisopropyl titanate was added thereto, and the reaction was further continued while reducing the pressure of the reaction system to from 100 to 200 mmHg. After the reaction product had an acid value of 1.0, the vacuum degree in the container was gradually increased and the reaction was stopped. Next, the reaction system was cooled to 100° C., and 3% by weight of water was added thereto and heated for 2 hours while stirring, whereby the titanium catalyst was deactivated. Then, water was removed from the container through distillation under reduced pressure, and 10 ppm (3.4 ppm in terms of tin) of a tin catalyst for urethanation, dibutyltin diacetate was added. In that manner, obtained was polyester-polyol A1. The number average molecular weight, the number of hydroxyl groups per one molecule, the ester group content and the crystallization enthalpy ($\Delta H$) of the thus-obtained polyester-polyol A1 are shown in Table 6 below.

Reference Examples 2 to 16

The same process as in Reference Example 1 was repeated except that the polyol component and the dicarboxylic acid component shown in Table 6 below were used. Briefly, after the esterification, the titanium catalyst for polycondensation was deactivated, and the tin catalyst for urethanation was added. Thus were obtained the corresponding polyester-polyols B1 to P1. The number average molecular weight, the number of hydroxyl groups per one molecule, the ester group content and the crystallization enthalpy ($\Delta H$) of each of the thus-obtained polyester-polyols B1 to P1 are shown in Table 6 below.

metering pump, and these were subjected to continuous melt polymerization at 260° C. The melt of the polyurethane produced was continuously and strand-wise extruded out into water. The resulting polyurethane strands were cut with a pelletizer. The resulting pellets were dried at 50° C. for 5 hours. The melt viscosity and the melt-moldability of the thus-obtained polyurethane are shown in Table 8 below.

Films were formed from the polyurethane through extrusion at 200° C. Some of these were left at room temperature (23° C.) for one week, while the others were annealed at 80° C. for 24 hours. The heat resistance, the friction melt resistance, the hydrolysis resistance, the cold resistance and the DMF-insoluble content of these films were measured. Apart from these, discs were formed from the polyurethane through injection molding at 195° C. Some of these were left at room temperature (23° C.) for 1 week, while the others were annealed at 80° C. for 24 hours. The hardness and the compression set of these discs were measured. The results obtained are shown in Table 8 and Table 9 below.

Examples 2 to 10

In the same manner as in Example 1 except that the polyester-polyols, MDI and the chain extenders shown in Table 7 below were used at the ratios shown therein, produced were polyurethane samples and molded articles thereof. These were tested and evaluated in the same manner as in Example 1. The results obtained are shown in Table 8 and Table 9 below.

Comparative Examples 1 to 10

In the same manner as in Example 1 except that the polyester-polyols, MDI and the chain extenders shown in Table 7 below were used at the ratios shown therein,

TABLE 6

| Reference Example | Polyester-polyol | Constitutive Components of Polyester-polyol | | Ester Group Content | f*1 | Number Average Molecular Weight | $\Delta H$ (J/g) | Amount of Tin Catalyst Added (ppm) |
|---|---|---|---|---|---|---|---|---|
| | | Polyol Component (ratio by mol) | Dicarboxylic Acid Component (ratio by mol) | | | | | |
| 1 | A1 | ND/MPD (5/5) | Ad | 0.141 | 2.00 | 3000 | 44.7 | DBA (10) |
| 2 | B1 | ND/MPD (5/5) | Ad | 0.144 | 2.00 | 5000 | 54.0 | DBA (10) |
| 3 | C1 | ND/MPD/TMP (5/5/0.87) | Ad | 0.143 | 3.00 | 3000 | 43.2 | DBL (10) |
| 4 | D1 | ND/MPD/TMP (5/5/0.039) | Ad | 0.141 | 2.05 | 3000 | 42.1 | DBL (10) |
| 5 | E1 | ND/MPD/TMP (5/5/0.017) | Ad | 0.141 | 2.02 | 3000 | 44.0 | DBA (10) |
| 6 | F1 | ND | IPA/Ad (3/7) | 0.121 | 2.00 | 3000 | 60.0 | DBL (10) |
| 7 | G1 | ND/TMP (10/0.048) | IPA/Ad (3/7) | 0.121 | 2.05 | 3000 | 59.1 | DBA (10) |
| 8 | H1 | ND/MPD (5/5) | Ad | 0.107 | 2.00 | 500 | 37.2 | DBA (10) |
| 9 | I1 | ND/MPD (5/5) | Ad | 0.146 | 2.00 | 9000 | 62.1 | DBA (10) |
| 10 | J1 | EG/TMP (10/0.028) | Ad | 0.246 | 2.05 | 3000 | 66.8 | DBL (10) |
| 11 | K1 | EG | Ad | 0.245 | 2.00 | 2000 | 66.8 | DBL (10) |
| 12 | L1 | ND | Ad | 0.123 | 2.00 | 2000 | 90.1 | DBA (10) |
| 13 | M1 | ND/TMP (10/0.073) | Ad | 0.123 | 2.05 | 2000 | 89.8 | DBL (10) |
| 14 | N1 | MPD/TMP (10/0.057) | AZ | 0.126 | 2.04 | 2000 | —*2 | DBA (10) |
| 15 | O1 | MPD/TMP (10/0.033) | Ad | 0.156 | 2.03 | 2000 | —*2 | DBA (10) |
| 16 | P1 | ND/MPD (5/5) | Ad | 0.138 | 2.00 | 2000 | 53.4 | DBA (10) |

*1: Number of hydroxyl group per one molecule.
*2: Not detected.

Example 1

Polyester-polyol A1 obtained in Reference Example 1, polyester-polyol C1 obtained in Reference Example 3, a chain extender comprising BD and ND, and an organic diisocyanate, MDI as melted under heat at 50° C. were continuously fed into a double-screw extruder (30 mm$\phi$, L/D=36) with two screws rotating in the same axial direction, at the ratio shown in Table 7 below, using a produced were polyurethane samples and molded articles thereof. These were tested and evaluated in the same manner as in Example 1. The results obtained are shown in Table 8 and Table 9 below.

TABLE 7

| Example | Polyester-polyol Constitutive Components (molar ratio) | Ester Group Content | f*1 | Number Average Molecular Weight | ΔH (J/g) | Chain extender (molar ratio) | Constitutive Components of Polyurethane (molar ratio) Polyester-polyol(a):MDI(b):Chain extender(c) | b/(a + c) |
|---|---|---|---|---|---|---|---|---|
| Example |  |  |  |  |  |  |  |  |
| 1 | A1/C1 (0.95/0.05) | 0.141 | 2.05 | 3000 | 44.6 | BD/ND (0.85/0.15) | 1:5.53:4.40 | 1.02 |
| 2 | D1 | 0.141 | 2.05 | 3000 | 42.1 | BD/ND (0.85/0.15) | 1:5.53:4.40 | 1.02 |
| 3 | D1 | 0.141 | 2.05 | 3000 | 42.1 | BD/ND (0.85/0.15) | 1:5.53:4.40 | 1.005 |
| 4 | E1 | 0.141 | 2.02 | 3000 | 44.0 | BD/ND (0.90/0.10) | 1:5.46:4.40 | 1.01 |
| 5 | B1/C1 (0.98/0.02) | 0.144 | 2.02 | 4960 | 53.6 | BD/ND (0.85/0.15) | 1:4.09:3.00 | 1.02 |
| 6 | F1/C1 (0.95/0.05) | 0.122 | 2.05 | 3000 | 59.3 | BD | 1:4.31:3.20 | 1.02 |
| 7 | G1 | 0.121 | 2.05 | 3000 | 59.1 | BD | 1:4.31:3.20 | 1.02 |
| 8 | N1 | 0.126 | 2.04 | 2000 | —*2 | BD | 1:3.64:2.60 | 1.01 |
| 9 | O1 | 0.156 | 2.03 | 2000 | —*2 | BD | 1:3.64:2.60 | 1.01 |
| 10 | P1/C1 (0.98/0.02) | 0.138 | 2.02 | 2000 | 53.2 | BD | 1:3.65:2.60 | 1.01 |
| Comparative Example |  |  |  |  |  |  |  |  |
| 1 | A1 | 0.141 | 2.00 | 3000 | 44.7 | BD/ND (0.85/0.15) | 1:5.40:4.40 | 1.00 |
| 2 | A1/C1 (0.90/0.10) | 0.142 | 2.10 | 3000 | 44.5 | BD/ND (0.85/0.15) | 1:5.64:4.40 | 1.02 |
| 3 | A1/C1 (0.95/0.05) | 0.141 | 2.05 | 3000 | 44.6 | BD/ND (0.85/0.15) | 1:5.32:4.40 | 0.98 |
| 4 | N1 | 0.126 | 2.04 | 2000 | —*2 | BD | 1:4.16:2.60 | 1.15 |
| 5 | H1/C1 (0.95/0.05) | 0.129 | 2.05 | 625 | 37.5 | BD | 1:1.55:0.49 | 1.02 |
| 6 | I1/C1 (0.95/0.05) | 0.146 | 2.05 | 8700 | 61.2 | BD/ND (0.85/0.15) | 1:7.55:6.38 | 1.02 |
| 7 | K1/C1 (0.98/0.02) | 0.243 | 2.02 | 2020 | 66.5 | BD | 1:3.68:2.60 | 1.02 |
| 8 | J1 | 0.246 | 2.05 | 3000 | 66.8 | BD/ND (0.85/0.15) | 1:5.53:4.40 | 1.02 |
| 9 | L1/C1 (0.95/0.05) | 0.127 | 2.05 | 2050 | 88.0 | BD | 1:3.70:2.60 | 1.02 |
| 10 | M1 | 0.123 | 2.05 | 2000 | 89.8 | BD | 1:3.66:2.60 | 1.01 |

*1: Number of hydroxyl group per one molecule.
*2: Not detected.

TABLE 8

[Samples were left at room temperature (23° C.) for 1 week, after having been molded.]

| Example | Physical Properties of Pellets Melt Viscosity (poise) | Melt Moldability (%) | Physical Properties of Injection-molded Articles Hardness (JIS A) | Compression Set (%) | Physical Properties of Extrusion-molded Films Heat Resistance (kgf/cm²) | Friction Melt Resistance Area Melted by Friction | Condition of Molten Surface | Cold Resistance (° C.) | Hydrolysis Resistance (%) | DMF-insoluble Content (wt. %) |
|---|---|---|---|---|---|---|---|---|---|---|
| Example |  |  |  |  |  |  |  |  |  |  |
| 1 | 9640 | 7 | 84 | 17 | 495 | 5 | o | −45 | 88 | 85 |
| 2 | 9320 | 5 | 84 | 18 | 488 | 5 | o | −45 | 87 | 86 |
| 3 | 11310 | 1 | 83 | 21 | 430 | 5 | o | −44 | 86 | 60 |
| 4 | 8850 | 8 | 84 | 18 | 530 | 5 | o | −45 | 85 | 68 |
| 5 | 3520 | 10 | 70 | 12 | 262 | 3 | Δ | −49 | 86 | 76 |
| 6 | 17830 | 19 | 85 | 20 | 440 | 5 | o | −33 | 92 | 82 |
| 7 | 17650 | 17 | 85 | 19 | 431 | 5 | o | −34 | 91 | 83 |
| 8 | 6800 | 14 | 85 | 23 | 440 | 5 | o | −43 | 92 | 85 |
| 9 | 6310 | 12 | 84 | 25 | 410 | 5 | o | −34 | 80 | 79 |
| 10 | 5870 | 13 | 85 | 24 | 425 | 5 | o | −38 | 86 | 70 |
| Comparative Example |  |  |  |  |  |  |  |  |  |  |
| 1 | 3210 | 8 | 84 | 48 | 221 | 1 | x | −44 | 75 | 0 |
| 2 | 32300 | 51 | 86 | 16 | 225 | 2 | o | −36 | 78 | 98 |
| 3 | 8840 | 2 | 84 | 45 | 132 | 1 | x | −45 | 62 | 0 |
| 4 | 1450 | 189 | 88 | 17 | —*1 | —*1 | —*1 | —*1 | —*1 | —*1 |
| 5 | 3360 | −3 | 82 | 59 | 112 | 1 | x | −25 | 82 | 76 |
| 6 | 6230 | 182 | 71 | 24 | —*1 | —*1 | —*1 | —*1 | —*1 | —*1 |
| 7 | 8020 | 1 | 85 | 38 | 165 | 1 | x | −23 | 17 | 73 |
| 8 | 9240 | 3 | 84 | 32 | 232 | 2 | Δ | −22 | 22 | 76 |

TABLE 8-continued

[Samples were left at room temperature (23° C.) for 1 week, after having been molded.]

| | Physical Properties of Pellets | | Physical Properties of Injection-molded Articles | | Physical Properties of Extrusion-molded Films | | | | | DMF-insoluble Content (wt. %) |
|---|---|---|---|---|---|---|---|---|---|---|
| | | | | | | Friction Melt Resistance | | | | |
| Example | Melt Viscosity (poise) | Melt Moldability (%) | Hardness (JIS A) | Compression Set (%) | Heat Resistance (kgf/cm²) | Area Melted by Friction | Condition of Molten Surface | Cold Resistance (° C.) | Hydrolysis Resistance (%) | |
| 9 | 9390 | 35 | 85 | 20 | 427 | 5 | ○ | −9 | 89 | 85 |
| 10 | 9110 | 43 | 84 | 21 | 410 | 5 | ○ | −10 | 92 | 83 |

*1: Polyurethanes of Comparative Examples 4 and 6 could not be formed into film through extrusion and therefore could not be evaluated.

TABLE 9

[Samples were annealed at 80° C. for 24 hours, after having been molded.]

| | Physical Properties of Injection-molded Articles | | Physical Properties of Extrusion-molded Films | | | | | DMF-insoluble Content (wt. %) |
|---|---|---|---|---|---|---|---|---|
| | | | | Friction Melt Resistance | | | | |
| Example | Hardness (JIS A) | Compression Set (%) | Heat Resistance (kgf/cm²) | Area Melted by Friction | Condition of Molten Surface | Cold Resistance (° C.) | Hydrolysis Resistance (%) | |
| Example | | | | | | | | |
| 1 | 83 | 13 | 555 | 5 | ○ | −45 | 90 | 85 |
| 2 | 83 | 13 | 528 | 5 | ○ | −45 | 91 | 88 |
| 3 | 83 | 16 | 450 | 5 | ○ | −45 | 84 | 65 |
| 4 | 84 | 12 | 542 | 5 | ○ | −45 | 85 | 72 |
| 5 | 70 | 7 | 297 | 4 | Δ | −48 | 91 | 86 |
| 6 | 84 | 16 | 470 | 5 | ○ | −34 | 93 | 89 |
| 7 | 84 | 13 | 473 | 5 | ○ | −34 | 92 | 88 |
| 8 | 84 | 20 | 452 | 5 | ○ | −43 | 93 | 92 |
| 9 | 84 | 21 | 443 | 5 | ○ | −34 | 81 | 83 |
| 10 | 85 | 21 | 450 | 5 | ○ | −38 | 86 | 80 |
| Comparative Example | | | | | | | | |
| 1 | 84 | 34 | 241 | 1 | x | −44 | 83 | 0 |
| 2 | 86 | 11 | 265 | 2 | ○ | −36 | 85 | 98 |
| 3 | 83 | 38 | 142 | 1 | x | −46 | 45 | 0 |
| 4 | 84 | 7 | —*1 | —*1 | —*1 | —*1 | —*1 | —*1 |
| 5 | 82 | 32 | 141 | 2 | x | −24 | 83 | 76 |
| 6 | 72 | 22 | —*1 | —*1 | —*1 | —*1 | —*1 | —*1 |
| 7 | 84 | 29 | 182 | 1 | x | −24 | 17 | 78 |
| 8 | 84 | 23 | 266 | 2 | Δ | −22 | 19 | 81 |
| 9 | 84 | 11 | 488 | 5 | ○ | −10 | 90 | 87 |
| 10 | 84 | 10 | 461 | 5 | ○ | −10 | 91 | 86 |

*1: Polyurethanes of Comparative Examples 4 and 6 could not be formed into film through extrusion and therefore could not be evaluated.

As is obvious from Table 8 and Table 9, the thermoplastic polyurethanes of the present invention have excellent melt-moldability and the properties of the articles obtained by molding them are totally excellent with respect to the heat resistance, the friction melt resistance, the compression set, the hydrolysis resistance and the cold resistance (see Examples 1 to 10).

As opposed to these, it is known that the molded articles produced from the comparative polyurethanes which are different from the polyurethanes of the present invention in the ester group content, the number average molecular weight, the number of hydroxyl groups per one molecule and the crystallization enthalpy (ΔH) of the polyester-polyols used and in the proportions of the constitutive components of the polyurethanes are inferior to those produced from the polyurethanes of the present invention in that at least one property of the heat resistance, the friction melt resistance, the compression set, the melt-moldability, the hydrolysis resistance and the cold resistance of the former is not good (see Comparative Examples 1 to 10).

Reference Examples 17 to 28

The same process as in Reference Example 1 was repeated except that the polyol component and the dicarboxylic acid component shown in Table 10 below were used. Briefly, after the esterification, the titanium catalyst for polycondensation was deactivated, and the tin catalyst for urethanation was added. Thus were obtained the corresponding polyester-polyols A2 to L2. The number average molecular weight, the number of hydroxyl groups per one molecule, the ester group content and the crystallization enthalpy (ΔH) of each of the thus-obtained polyester-polyols A2 to L2 are shown in Table 10 below.

TABLE 10

| Reference Example | Polyester-polyol | Constitutive Components of Polyester-polyol | | Ester Group Content | f*1 | Number Average Molecular Weight | Δ H (J/g) | Amount of Tin Catalyst Added (ppm) |
|---|---|---|---|---|---|---|---|---|
| | | Polyol Component (molar ratio) | Dicarboxylic Acid Component (molar ratio) | | | | | |
| 17 | A2 | MPD | Ad | 0.156 | 2.00 | 2000 | —*2 | DBA (10) |
| 18 | B2 | MPD/TMP (10/0.0033) | Ad | 0.156 | 2.03 | 2000 | —*2 | DBA (10) |
| 19 | C2 | MPD/TMP (10/0.109) | Ad | 0.156 | 2.10 | 2000 | —*2 | DBA (10) |
| 20 | D2 | MPD/TMP (10/1.22) | Ad | 0.157 | 3.00 | 2000 | —*2 | DBL (10) |
| 21 | E2 | ND/MPD (5/5) | Ad | 0.141 | 2.00 | 3000 | 44.7 | DBL (10) |
| 22 | F2 | ND/MPD/TMP (5/5/0.032) | Ad | 0.141 | 2.04 | 3000 | 44.0 | DBA (10) |
| 23 | G2 | MPD/TMP (10/0.057) | AZ | 0.126 | 2.04 | 2000 | —*2 | DBL (10) |
| 24 | H2 | MPD | Ad | 0.163 | 2.00 | 5000 | —*2 | DBA (10) |
| 25 | I2 | MPD | Ad | 0.128 | 2.00 | 500 | —*2 | DBA (10) |
| 26 | J2 | ND | Ad | 0.122 | 2.00 | 2000 | 90.1 | DBA (10) |
| 27 | K2 | EG | Ad | 0.245 | 2.00 | 2000 | 72.4 | DBL (10) |
| 28 | L2 | EG/PG/TMP (7/3/0.027) | Ad | 0.234 | 2.03 | 1850 | 25.0 | DBL (10) |

*1: Number of hydroxyl group per one molecule.
*2: Not detected.

Example 11

Polyester-polyol A2 obtained in Reference Example 17, polyester-polyol D2 obtained in Reference Example 20, a chain extender BD, and an organic diisocyanate, MDI as melted under heat at 50° C. were continuously fed into a double-screw extruder (30 mmφ, L/D=36) with two screws rotating in the same axial direction, at the ratio shown in Table 11 below, using a metering pump, and these were subjected to continuous melt polymerization at 260° C. The melt of the polyurethane produced was continuously and strand-wise extruded out into water. The resulting polyurethane strands were cut with a pelletizer. The resulting pellets were dried at 80° C. for 6 hours.

On the other hand, 50 parts by weight of a sea component polyethylene and 50 parts by weight of an island component 6-nylon were melt-spun in one and the same melt system to produce composite fibers having a single fiber fineness of 10 deniers. The composite fibers were stretched by 3.0 times the original length, then crimped and cut to have a length of 51 mm. Next, these were opened with curd and then formed into webs using a cross-wrapper weaver. Using a needle punch, the webs were formed into fibers-entangled, non-woven fabric having a weight of 650 g/m². The non-woven fabric was then dipped in a solution comprising 13 parts by weight of a polyurethane composition consisting essentially of a polyether-polyurethane and 87 parts by weight of dimethylformamide, and the thus-infiltrated solution was solidified in the fabric. After having been washed with water, the non-woven fabric was treated with toluene by which polyethylene remaining in the composite fibers was removed through extraction. Thus was obtained a fibrous base layer composed of extrafine 6-nylon fiber strands and polyurethane binder and having a thickness of about 1.3 mm.

A melt of the polyurethane obtained hereinabove was film-wise extruded at 210° C. through the fibrous base layer and a pressure roll attached thereto to form a film having a thickness of 300 μm on the fibrous base layer, while pressing the polyurethane film against the fibrous base layer with the pressure roll. Thus was obtained a laminate comprising the fibrous base layer and the polyurethane layer. The abrasion resistance (on the basis of the amount of Taber's abrasion and the friction melt resistance of the laminate and also the bleeding-out/whitening condition of the surface thereof were measured and observed according to the methods mentioned above. The results obtained are shown in Table 12 below.

Examples 12 to 18

In the same manner as in Example 11 except that the polyester-polyols, the organic diisocyanate and the chain extenders shown in Table 11 below were used at the ratios shown therein, produced were polyurethane pellets. Using these pellets, produced were laminates composed of a fibrous base layer and a polyurethane layer also in the same manner as in Example 11. These laminates were tested and evaluated in the same manner as in Example 11. The results obtained are shown in Table 12 below.

Comparative Examples 11, 12, 15, 16, 17, 19

In the same manner as in Example 11 except that the polyester-polyols, the organic diisocyanate and the chain extenders shown in Table 11 below were used at the ratios shown therein, produced were polyurethane pellets. Using these pellets, produced were laminates composed of a fibrous base layer and a polyurethane layer also in the same manner as in Example 11. These laminates were tested and evaluated in the same manner as in Example 11. The results obtained are shown in Table 12 below.

Comparative Examples 13, 14, 18

In the same manner as in Example 11 except that the polyester-polyols, the organic diisocyanate and the chain extenders shown in Table 11 below were used at the ratios shown therein, produced were polyurethane pellets. Using these pellets, laminates composed of a fibrous base layer and a polyurethane layer were tried to be produced but in vain because of the poor melt-moldability of the pellets.

TABLE 11

| Example | Polyester-polyol Constitutive Components (molar ratio) | Ester Group Content | f*1 | Number Average Molecular Weight | ΔH (J/g) | Chain extender (molar ratio) | Constitutive Components of Polyurethane (molar ratio) Polyester-polyol(a):MDI(b):Chain extender(c) | b/(a + c) |
|---|---|---|---|---|---|---|---|---|
| Example | | | | | | | | |
| 11 | A2/D2 (0.97/0.03) | 0.156 | 2.03 | 2000 | —*2 | BD | 1:3.88:2.80 | 1.02 |
| 12 | A2/D2 (0.98/0.02) | 0.156 | 2.02 | 2000 | —*2 | BD | 1:3.88:2.80 | 1.02 |
| 13 | A2/D2 (0.93/0.07) | 0.156 | 0.07 | 2000 | —*2 | BD | 1:3.91:2.80 | 1.03 |
| 14 | B2 | 0.156 | 2.03 | 2000 | —*2 | BD | 1:3.88:2.80 | 1.02 |
| 15 | G2 | 0.126 | 2.04 | 2000 | —*2 | BD | 1:3.90:2.80 | 1.03 |
| 16 | G2 | 0.126 | 2.04 | 2000 | —*2 | BD | 1:3.90:2.80 | 1.03 |
| 17 | E2/D2 (0.96/0.04) | 0.142 | 2.04 | 2960 | 44.2 | BD/ND (0.85/0.15) | 1:5.47:4.40 | 1.01 |
| 18 | F2 | 0.141 | 2.04 | 3000 | 44.0 | BD/ND (0.85/0.15) | 1:5.47:4.40 | 1.01 |
| Comparative Example | | | | | | | | |
| 11 | A2 | 0.156 | 2.00 | 2000 | —*2 | BD | 1:3.88:2.80 | 1.02 |
| 12 | A2/D2 (0.97/0.03) | 0.156 | 2.03 | 2000 | —*2 | BD | 1:3.69:2.80 | 0.97 |
| 13 | A2/D2 (0.98/0.02) | 0.156 | 2.02 | 2000 | —*2 | BD | 1:4.30:2.80 | 1.13 |
| 14 | C2 | 0.156 | 2.10 | 2000 | —*2 | BD | 1:3.93:2.80 | 1.03 |
| 15 | K2/D2 (0.97/0.03) | 0.241 | 2.03 | 2000 | 71.4 | BD | 1:3.88:2.80 | 1.02 |
| 16 | J2/D2 (0.98/0.02) | 0.123 | 2.03 | 2000 | 89.7 | BD | 1:3.88:2.88 | 1.01 |
| 17 | I2/D2 (0.98/0.02) | 0.163 | 2.02 | 530 | —*2 | BD | 1:1.16:0.14 | 1.02 |
| 18 | H2/D2 (0.98/0.02) | 0.129 | 2.02 | 4940 | —*2 | BD/ND (0.85/0.15) | 1:8.49:7.41 | 1.01 |
| 19 | L2 | 0.234 | 2.03 | 1850 | 25.0 | BD | 1:3.88:2.80 | 1.02 |

*1: Number of hydroxyl group per one molecule.
*2: Not detected.

TABLE 12

| Example | | Amount of Taber's Abrasion (mg) | Friction Melt Resistance Area Melted by Friction | Friction Melt Resistance Condition of Molten Surface | Bleeding-out/ Whitening Condition |
|---|---|---|---|---|---|
| Example | 11 | 8 | 5 | ○ | ○ |
| | 12 | 9 | 5 | ○ | ○ |
| | 13 | 7 | 5 | ○ | ○ |
| | 14 | 9 | 5 | ○ | ○ |
| | 15 | 6 | 5 | ○ | ○ |
| | 16 | 8 | 5 | ○ | ○ |
| | 17 | 6 | 5 | ○ | ○ |
| | 18 | 6 | 5 | ○ | ○ |
| Comparative Example | 11 | 20 | 3 | Δ | ○ |
| | 12 | 28 | 1 | X | ○ |
| | 13 | —*1 | —*1 | —*1 | —*1 |
| | 14 | —*1 | —*1 | —*1 | —*1 |
| | 15 | 22 | 1 | X | X |
| | 16 | 11 | 5 | ○ | XXX |
| | 17 | 20 | 1 | X | ○ |
| | 18 | —*1 | —*1 | —*1 | —*1 |
| | 19 | 29 | 1 | X | ○ |

*1: No laminate was obtained in Comparative Examples 13, 14 and 18, and therefore the evaluation of the samples in these was impossible.

As in obvious from Table 12, the laminates of the present invention are totally excellent with respect to the abrasion resistance based on the amount of the Taber's abrasion), the friction resistance, the bleeding resistance and the whitening resistance (see Examples 11 to 18).

As opposed to these, it is known that the laminates comprising the comparative polyurethanes which are different from the polyurethanes of the present invention in the ester group content, the number average molecular weight, the number of hydroxyl groups per one molecule and the crystallization enthalpy (ΔH) of the polyester-polyols used and in the proportions of the constitutive components of the polyurethanes are inferior to those comprising the polyurethanes of the present invention in that at least one property of the abrasion resistance (based on the amount of the Taber's abrasion), the friction melt resistance, the bleeding resistance and the whitening resistance (see Comparative Examples 11 to 19).

Reference Examples 29, 31, 32, 34 to 45

The same process as in Reference Example 1 was repeated except that the polyol component and the dicarboxylic acid component shown in Table 13 below were used. Briefly, after the esterification, the titanium catalyst for polycondensation was deactivated. Thus were obtained the corresponding polyester-polyols A3, C3, D3, F3 to Q3. The number average molecular weight, the number of hydroxyl groups per one molecule, the ester group content and the crystallization enthalpy (ΔH) of each of the thus-obtained polyester-polyols A3, C3, D3, F3 to Q3 are shown in Table 13 below.

Reference Examples 30 and 33

The same process as in Reference Example 1 was repeated except that the polyol component and the dicarboxylic acid component shown in Table 13 below were used. Briefly, after the esterification, the titanium catalyst for polycondensation was deactivated, and the tin catalyst for urethanation was added. Thus were obtained the corresponding polyester-polyols B3 and E3. The number average molecular weight, the number of hydroxyl groups per one molecule, the ester group content and the crystallization enthalpy (ΔH) of each of the thus-obtained polyester-polyols B3 and E3 are shown in Table 13 below.

TABLE 13

| Reference Example | Polyester-polyol | Constitutive Components of Polyester-polyol | | Ester Group Content | f*1 | Number Average Molecular Weight | Δ H (J/g) | Amount of Tin Catalyst Added (ppm) |
|---|---|---|---|---|---|---|---|---|
| | | Polyol Component (molar ratio) | Dicarboxylic Acid Component (molar ratio) | | | | | |
| 29 | A3 | MPD | AZ | 0.126 | 2.00 | 2000 | —*2 | — |
| 30 | B3 | MPD | AZ | 0.126 | 2.00 | 2000 | —*2 | DBA (6) |
| 31 | C3 | MPD/TMP (161/1) | AZ | 0.126 | 2.05 | 2000 | —*2 | — |
| 32 | D3 | MPD/TMP (102/1) | AZ | 0.126 | 2.08 | 2000 | —*2 | — |
| 33 | E3 | MPD/TMP (102/1) | AZ | 0.126 | 2.08 | 2000 | —*2 | DBA (6) |
| 34 | F3 | MPD/TMP (55/1) | AZ | 0.126 | 2.15 | 2000 | —*2 | — |
| 35 | G3 | MPD | Ad | 0.157 | 2.00 | 2000 | —*2 | — |
| 36 | H3 | MPD/TMP (187/1) | Ad | 0.157 | 2.05 | 2000 | —*2 | — |
| 37 | I3 | MPD | Sb | 0.118 | 2.00 | 2000 | 35 | — |
| 38 | J3 | MPD/TMP (155/1) | Sb | 0.118 | 2.05 | 2000 | 35 | — |
| 39 | K3 | BD | Ad | 0.192 | 2.00 | 2000 | 77 | — |
| 40 | L3 | BD/TMP (213/1) | Ad | 0.192 | 2.05 | 2000 | 77 | — |
| 41 | M3 | ND | Ad | 0.123 | 2.00 | 2000 | 90 | — |
| 42 | N3 | ND/TMP (158/1) | Ad | 0.123 | 2.05 | 2000 | 90 | — |
| 43 | O3 | EG/PG/TMP (202/40/1) | Ad | 0.239 | 2.05 | 2000 | 36 | — |
| 44 | P3 | MPD/TMP (799/1) | AZ | 0.126 | 2.01 | 2000 | —*2 | — |
| 45 | Q3 | MPD/TMP (91/1) | AZ | 0.126 | 2.09 | 2000 | —*2 | — |

*1: Number of hydroxyl group per one molecule.
*2: Not detected.

Example 19

Polyester-polyol C3 obtained in Reference Example 31, which had been heated at 80° C., BD which had been heated at 80° C. and MDI as melted under heat at 50° C. were continuously fed into a double-screw extruder (30 mmφ, L/D=36) with two screws rotating in the same axial direction, at the ratio shown in Table 14 below, using a metering pump, and these were subjected to continuous melt polymerization at 260° C. The melt of the polyurethane produced was continuously and strand-wise extruded out into water. The resulting polyurethane strands were cut with a pelletizer. The resulting pellets were dried at 80° C. for 20 hours in vacuum.

The dry polyurethane pellets were fed into an ordinary spinning device equipped with a single-screw extruder and melt-spun into monofilaments at a spinning temperature falling between 200° C. and 240° C. and at a spinning rate of 500 m/sec or lower while cooling with cold water at a dew point of 10° C., and the monofilaments were wound up around a bobbin. Thus were produced resilient polyurethane fibers (monofilaments) (40 d/f). The stability during spinning was checked according to the method mentioned above, and the results obtained are shown in Table 15 below.

The resilient polyurethane fibers, while having been wound around the bobbin, ripened at 80° C. in a low-humidity condition (dew point=about −30° C.) for 20 hours and then further ripened at room temperature and at a relative humidity of 60% for 10 days. The logarithmic viscosity, the heat resistance, the hot water resistance, the wet heat resistance, the restorability of resilience and the homogeneousness of the thus-ripened resilient polyurethane fibers were measured and checked in accordance with the methods mentioned above. The results obtained are shown in Table 15 below.

Examples 20 to 26

In the same manner as in Example 19 except that the polyester-polyols, polyols, the organic diisocyanate and the chain extenders shown in Table 14 below were used at the ratios shown therein, produced were polyurethane pellets. The resulting pellets were melt-spun into fibers also in the same manner as in Example 19 to obtain resilient polyurethane fibers (monofilaments). The stability during spinning is shown in Table 15 below. The resilient polyurethane fibers obtained were ripened in the same manner as in Example 19, and the logarithmic viscosity, the heat resistance, the hot water resistance, the wet heat resistance, the restorability of resilience and the homogeneousness of these fibers were measured and checked in accordance with the methods mentioned above. The results obtained are shown in Table 15 below.

Comparative Examples 20 to 33

In the same manner as in Example 1 except that the polyester-polyols, the organic diisocyanate and the chain extenders shown in Table 14 below were used at the ratios shown therein, produced were polyurethane pellets. The resulting pellets were melt-spun into fibers also in the same manner as in Example 19 to obtain resilient polyurethane fibers (monofilaments). The stability during spinning is shown in Table 15 below. The resilient polyurethane fibers obtained were ripened in the same manner as in Example 19, and the logarithmic viscosity, the heat resistance, the hot water resistance, the wet heat resistance, the restorability of resilience and the homogeneousness of these fibers were measured and checked in accordance with the methods mentioned above. The results obtained are shown in Table 15 below.

TABLE 14

| Example | Polyester-polyol | | | | | Constitutive Components of Polyurethane (molar ratio) | | |
|---|---|---|---|---|---|---|---|---|
| | Constitutive Components | Ester Group Content | f*1 | Number Average Molecular Weight | ΔH (J/g) | Chain extender | Polyester-polyol (a):MDI(b):Chain extender(c) | b/(a + c) |
| Example | | | | | | | | |
| 19 | C3 | 0.126 | 2.05 | 2000 | —*2 | BD | 1:3.68:2.50 | 1.05 |
| 20 | C3 | 0.126 | 2.05 | 2000 | —*2 | BD | 1:3.78:2.50 | 1.08 |
| 21 | C3 | 0.126 | 2.05 | 2000 | —*2 | BD | 1:4.20:3.00 | 1.05 |
| 22 | D3 | 0.126 | 2.08 | 2000 | —*2 | BD | 1:3.68:2.50 | 1.05 |
| 23 | E3 | 0.126 | 2.08 | 2000 | —*2 | BD | 1:3.68:2.50 | 1.05 |
| 24 | H3 | 0.157 | 2.05 | 2000 | —*2 | BD | 1:3.68:2.50 | 1.05 |
| 25 | J3 | 0.118 | 2.05 | 2000 | 35 | BD | 1:3.68:2.50 | 1.05 |
| 26 | P3 | 0.126 | 2.01 | 2000 | —*2 | BD | 1:3.68:2.50 | 1.05 |
| Comparative Example | | | | | | | | |
| 20 | A3 | 0.126 | 2.00 | 2000 | —*2 | BD | 1:3.68:2.50 | 1.05 |
| 21 | B3 | 0.126 | 2.00 | 2000 | —*2 | BD | 1:3.68:2.50 | 1.05 |
| 22 | F3 | 0.126 | 2.15 | 2000 | —*2 | BD | 1:3.68:2.50 | 1.05 |
| 23 | A3 | 0.126 | 2.00 | 2000 | —*2 | BD | 1:4.20:3.00 | 1.05 |
| 24 | C3 | 0.126 | 2.05 | 2000 | —*2 | BD | 1:3.33:2.50 | 0.99 |
| 25 | C3 | 0.126 | 2.05 | 2000 | —*2 | BD | 1:4.03:2.50 | 1.15 |
| 26 | G3 | 0.157 | 2.00 | 2000 | —*2 | BD | 1:3.68:2.50 | 1.05 |
| 27 | I3 | 0.118 | 2.00 | 2000 | 35 | BD | 1:3.68:2.50 | 1.05 |
| 28 | K3 | 0.192 | 2.00 | 2000 | 77 | BD | 1:3.68:2.50 | 1.05 |
| 29 | L3 | 0.192 | 2.05 | 2000 | 77 | BD | 1:3.68:2.50 | 1.05 |
| 30 | M3 | 0.123 | 2.00 | 2000 | 90 | BD | 1:3.68:2.50 | 1.05 |
| 31 | N3 | 0.123 | 2.05 | 2000 | 90 | BD | 1:3.68:2.50 | 1.05 |
| 32 | O3 | 0.239 | 2.05 | 2000 | 36 | BD | 1:3.68:2.50 | 1.05 |
| 33 | Q3 | 0.126 | 2.09 | 2000 | —*2 | BD | 1:3.68:2.50 | 1.05 |

*1: Number of hydroxyl group per one molecule.
*2: Not detected.

TABLE 15

| Example | Physical Properties of Resilient Fibers | | | | | | |
|---|---|---|---|---|---|---|---|
| | Stability during Spinning | Logarithmic Viscosity (dl/g) | Heat Resistance (°C.) | How Water Resistance R (g/80 d) | Wet Heat Resistance (%) | Restorability of Resilience (%) | Homogeneousness |
| Example | | | | | | | |
| 19 | ○ | Insoluble | 188 | 1.4 | 81 | 94 | ○ |
| 20 | ○ | Insoluble | 186 | 1.5 | 81 | 93 | ○ |
| 21 | ○ | Insoluble | 191 | 1.5 | 83 | 93 | ○ |
| 22 | ○ | Insoluble | 191 | 1.3 | 83 | 94 | ○ |
| 23 | ○ | Insoluble | 193 | 1.3 | 83 | 94 | ○ |
| 24 | ○ | Insoluble | 186 | 1.0 | 66 | 94 | ○ |
| 25 | ○ | Insoluble | 188 | 1.4 | 82 | 91 | ○ |
| 26 | ○ | Insoluble | 180 | 1.4 | 78 | 94 | ○ |
| Comparative Example | | | | | | | |
| 20 | Δ | 1.25 | 176 | 1.3 | 75 | 94 | Δ |
| 21 | Δ | 1.35 | 182 | 1.3 | 77 | 94 | Δ |
| 22 | X | Insoluble | 172 | 1.0 | 76 | 94 | Δ |
| 23 | X | 1.20 | 182 | 1.4 | 79 | 94 | X |
| 24 | Δ | 0.90 | 160 | 0.6 | 62 | 90 | X |
| 25 | X | Insoluble | 167 | 1.1 | 74 | 93 | X |
| 26 | Δ | 1.38 | 173 | 0.9 | 57 | 94 | Δ |
| 27 | X | 1.24 | 176 | 1.3 | 76 | 91 | X |
| 28 | ○ | 1.30 | 160 | 0.4 | 45 | 74 | Δ |
| 29 | ○ | Insoluble | 162 | 0.4 | 48 | 73 | Δ |
| 30 | X | 1.22 | 176 | 1.3 | 76 | 48 | Δ |
| 31 | Δ | Insoluble | 184 | 1.4 | 81 | 46 | ○ |
| 32 | ○ | Insoluble | 160 | 0.3 | 40 | 82 | Δ |
| 33 | Δ | Insoluble | 183 | 1.2 | 80 | 94 | Δ |

As is obvious from Table 15, the thermoplastic polyurethanes of the present invention can be stably spun into resilient fibers, of which the properties are totally excellent with respect to the heat resistance, the hot water resistance, the wet heat resistance, the restorability of resiliency and the homogeneousness (see Examples 19 to 26).

As opposed to these, it is known that the fibers produced from the comparative polyurethanes which are different from the polyurethanes of the present invention in the ester group content, the number average molecular weight, the number of hydroxyl groups per one molecule and the crystallization enthalpy ($\Delta$H) of the polyester-polyols used and in the proportions of the constitutive components of the polyurethanes are inferior to those produced from the polyurethanes of the present invention in that at least one property of the heat resistance, the hot water resistance, the wet heat resistance, the restorability of resiliency and the homogeneousness of the former is not good (see Comparative Examples 20 to 33).

What is claimed is:

1. Resilient polyurethane fibers comprising a thermoplastic polyurethane obtainable by reacting (a) a polyester-polyol that satisfies all the following requirements (1) to (4):

(1) its ester group content (number of ester bonds/number of all carbon atoms) is from 0.08 to 0.17;

(2) it has hydroxyl groups of from 2.01 to 2.08 per one molecule;

(3') it has a number average molecular weight of from 1000 to 5000; and (4) it has a crystallization enthalpy ($\Delta$H) of 70 J/g or less, (b) an organic diisocyanate and (c) a chain extender at a ratio that satisfies the following numerical formula (i):

$$1.00 \leq b/(a+c) \leq 1.10 \qquad (i)$$

where a indicates the number of mols of the polyester-polyol, b indicates the number of mols of the organic diisocyanate, and c indicates the number of mols of the chain extender.

2. A laminate composed of thermoplastic polyurethane layer(s) and fibrous base layer(s), which is characterized in that the thermoplastic polyurethane layer(s) is/are melt-molded layer(s) of a thermoplastic polyurethane obtainable by reacting (a) a polyester-polyol that satisfies all the following requirements (1) to (4):

(1) its ester group content (number of ester bonds/number of all carbon atoms) is from 0.08 to 0.17;

(2) it has hydroxyl groups of from 2.01 to 2.08 per one molecule;

(3") it has a number average molecular weight of from 1000 to 4000; and (4) it has a crystallization enthalpy ($\Delta$H) of 70 J/g or less, (b) an organic diisocyanate and (c) a chain extender at a ratio that satisfies the following numerical formula (i):

$$1.00 \leq b/(a+c) \leq 1.10 \qquad (i)$$

where a indicates the number of mols of the polyester-polyol, b indicates the number of mols of the organic diisocyanate, and c indicates the number of mols of the chain extender.

3. A method for producing resilient polyurethane fibers, which comprises melt-spinning a thermoplastic polyurethane obtainable by reacting (a) a polyester-polyol that satisfies all the following requirements (1) to (4):

(1) its ester group content (number of ester bonds/number of all carbon atoms) is from 0.08 to 0.17;

(2) it has hydroxyl groups of from 2.01 to 2.08 per one molecule;

(3') it has a number average molecular weight of from 1000 to 5000; and (4) it has a crystallization enthalpy ($\Delta$H) of 70 J/g or less, (b) an organic diisocyanate and (c) a chain extender at a ratio that satisfies the following numerical formula (i):

$$1.00 \leq b/(a+c) \leq 1.10 \qquad (i)$$

where a indicates the number of mols of the polyester-polyol, b indicates the number of mols of the organic diisocyanate, and c indicates the number of mols of the chain extender, or comprises melt-spinning the thermoplastic polyurethane while forming it by reacting the polyester-polyol (a), the organic diisocyanate (b) and the chain extender at the ratio satisfying the above-mentioned numerical formula (i).

* * * * *